March 21, 1967 M. D. TUPPER 3,310,448
APPARATUS FOR ADHESIVELY SECURING SEED ONTO A STRING
Filed Aug. 26, 1964 5 Sheets-Sheet 1

INVENTOR.
MYRON D. TUPPER
BY Hood, Gust + Irish
ATTORNEYS

March 21, 1967 M. D. TUPPER 3,310,448
APPARATUS FOR ADHESIVELY SECURING SEED ONTO A STRING
Filed Aug. 26, 1964 5 Sheets-Sheet 2
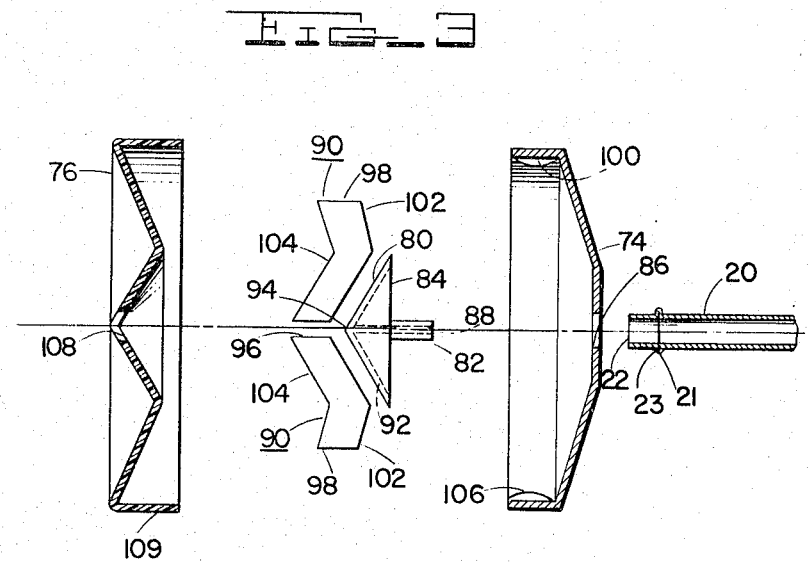
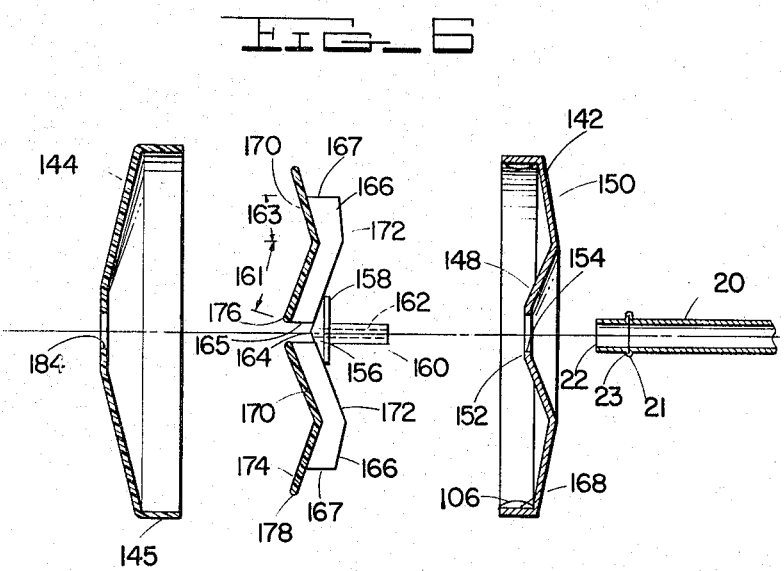
INVENTOR.
MYRON D. TUPPER
BY Hood, Gust & Irish
ATTORNEYS

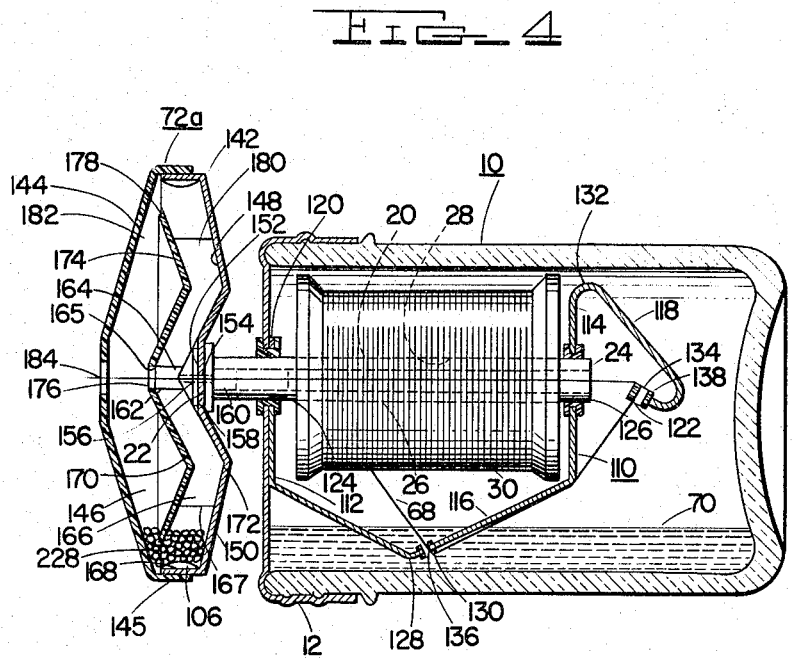
FIG_4
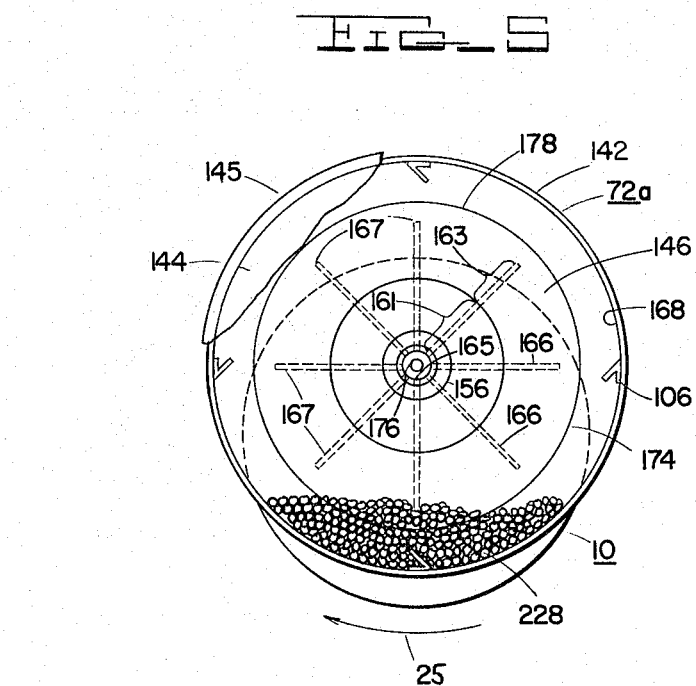
FIG_5

INVENTOR.
MYRON D. TUPPER
BY Hood, Gust + Irish
ATTORNEYS

March 21, 1967 M. D. TUPPER 3,310,448
APPARATUS FOR ADHESIVELY SECURING SEED ONTO A STRING
Filed Aug. 26, 1964 5 Sheets-Sheet 5
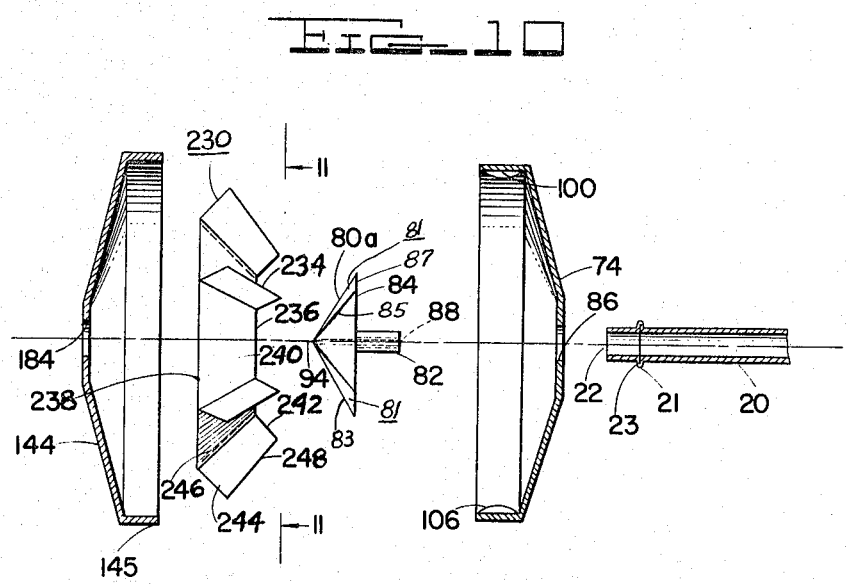
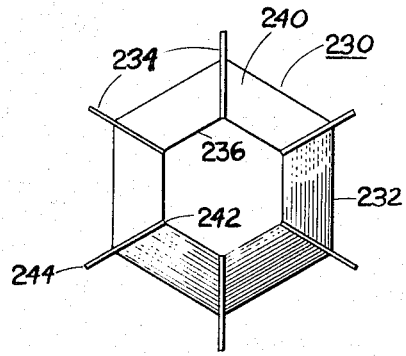
INVENTOR
MYRON D. TUPPER
BY *Hood, Gust & Irish*
ATTORNEYS

United States Patent Office 3,310,448
Patented Mar. 21, 1967

3,310,448
APPARATUS FOR ADHESIVELY SECURING SEED
ONTO A STRING
Myron D. Tupper, Fort Wayne, Ind.
(4606 SE. 100th Ave., Portland, Oreg. 97266)
Filed Aug. 26, 1964, Ser. No. 392,176
16 Claims. (Cl. 156—349)

The present invention generally relates to an apparatus that facilitates the planting of seeds in rows, and more specifically to an apparatus that adhesively secures seeds onto a string which easily can be planted.

Conventionally, plant seeds are planted in rows so as to space the seeds apart and to provide pathways between rows from which the rows may be cultivated, and at the same time effiicently utilize the ground. To facilitate the planting of seeds in rows, machines have been developed to produce tapes having seeds either adhesively or magnetically secured thereto at regular intervals. Such machines, however, are intended to produce seed tapes for retail sale. Therefore, such machines are designed with large production capacities in an effort to produce seed tapes that are relatively inexpensive. It is, therefore, somewhat inconsistent with the purpose of such machines that they be made portable. Hence, such machines do not have the advantages of portable machines. For example, a portable machine for adhesively securing seeds onto an elongated strip has been found to be very convenient in planting relatively small garden plots. This convenience stems from the production of an elongated strip to which seeds are secured at the location proximate to the planting site allowing the operator to attach one end of the strip to a stake near one boundary of the plot and to walk away from the stake along a row and arriving at the opposite boundary with a seed-strip already in the desired position. The planting operation is then completed by merely covering the strip with the desired amount of earth. Further, by designing a portable machine to adhesively secure seed onto a strip and which can be easily converted from one type of seed to another, the planting operation of a variety of seeds can be greatly simplified. It is therefore desirable to provide a portable apparatus for securing seeds onto a strip, which can be by either a tape, string, or the like. It is further desirable to provide such an apparatus that is inexpensive and portable and which can relatively easily be converted to produce seed tape having another type of seed attached thereto when it is desirable.

It is therefore a primary object of this invention to provide an improved apparatus for adhesively securing seeds onto an elongated strip.

It is another object of this invention to provide an apparatus for adhesively securing seeds onto a string.

A further object of this invention is to provide a portable apparatus for adhesively securing seeds onto an elongated strip which can be used to greatly simplify the planting of relatively small garden plots.

It is still further an object of this invention to provide an apparatus for securing seeds onto an elongated strip that can be relatively easily converted from one type of seed to another when a change is desired.

In accordance with the broader aspects of this invention a liquid-tight container is provided in which adhesive and a means for guiding a string through the adhesive and out through an opening in the container is placed. Attached to the container, in registry with the opening through which the string wet with adhesive is drawn, is a means which directs a substantially continuous agitated flow of seed onto the string wet with adhesive. The seeds are thereby adhesively secured onto the string in a random manner.

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is an exploded view, partly in cross-section, of the rotary seed applicator of the embodiment of this invention shown in FIG. 1;

FIG. 4 is a side view, partly in cross-section, of a second embodiment of this invention;

FIG. 5 is a front view of the embodiment of this invention shown in FIG. 4 with the cover partly broken away;

FIG. 6 is an exploded view, partly in cross-section, of the rotary seed applicator of the embodiment of this invention shown in FIG. 4;

FIG. 10 is an exploded side view, shown partly in cross-section of a fourth embodiment of a rotary seed applicator that utilizes several of the parts of the first and second embodiments and that can be substituted for either the first, second or third embodiments of the rotary seed applicator shown in FIGS. 1 through 9; and FIG. 11 is a front view of the vaned disc, shown in FIG. 10, and the only part of the fourth embodiment of the rotary seed applicator, shown in FIG. 10, which is not a part of one of the first three embodiments of the rotary seed applicator shown in FIGS. 1 through 9.

Figure 1:
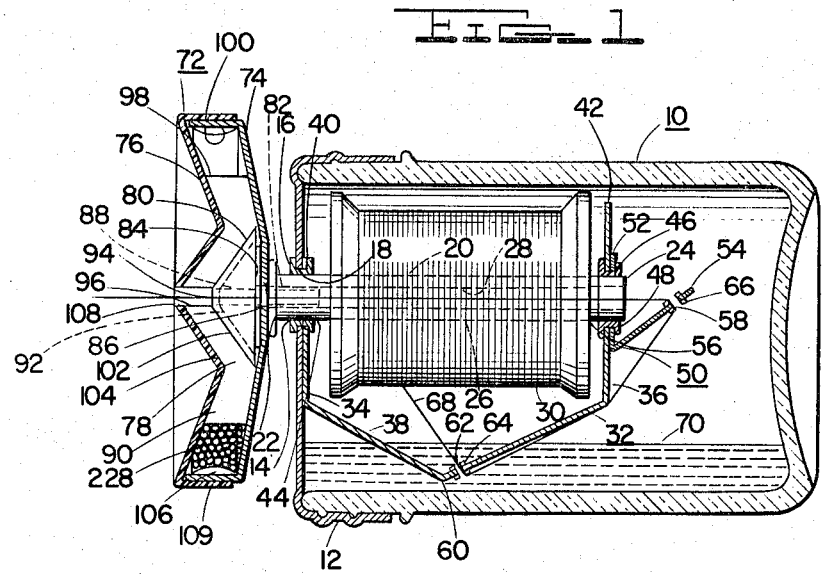
FIG. 1 is a side view, partly in cross-section, of a first embodiment of this invention.

Referring to the drawings, and more specifically to FIG. 1, there is shown a first embodiment of an apparatus for adhesively securing seeds onto a string comprising a conventional wide-mouthed glass jar 10 having a screw cover 12 which is adapted to form liquid-tight seal with the mouth of jar 10. Cover 12 has an opening 14 in which is secured a grommet 16 having an inwardly facing bearing surface 18. A shaft 20 having opposite ends 22 and 24 is inserted through grommet 16. Ends 22 and 24 are thereby located exteriorly of jar 10 and interiorly of jar 10, respectively. Shaft 20 has a coaxial constant diametered passageway 28 extending therethrough and communicating with both ends 22, 24. A conventional spool 30 is slid onto shaft 20 from end 24 and secured thereon by frictional adhesive or like means, thereby engaging spool 30 to the exterior surface 26. This securance of spool 30 to shaft 20 insures that spool 30 will not rotate independently of a shaft 20.

A yoke 32 is provided preferably formed of strip metal into a substantially U shape having a pair of upright portions 34, 36, an interconnecting central portion 38 and opposite ends 40, 42. Yoke 32 has two openings 44, 46 located in the upright portions 34, 36, adjacent ends 40, 42 respectively. Upright portion 34 is positioned on shaft 20, by means of opening 44, intermediate cover 12 and spool 30 and contiguous to cover 12. Grommet 16 is urged over both the thickness of cover 12 and the thickness of upright portion 34 thereby providing a bearing surface 18 which is somewhat wider than the thicknesses of cover 12 and portion 34; and at the same time, securing upright portion 34 to the inside surface of cover 12 in a relatively rigid manner. Upright portion 36 of yoke 32 is positioned on shaft 20 adjacent end 24 by means of opening 46. A support 50 is preferably formed into a V shape of strip metal similar to the strip metal of which yoke 32 is formed; support 50 has opposite ends 52 and 54 and openings 56 and 58 adjacent ends 52 and 54, respectively. Opening 56 is substantially the identical size of opening 46 in upright portion 36; whereas opening 58 is substantially smaller. Support portion 50 is scured to upright portion 36 of yoke 32 with opening 56 in registry with opening 46 by means of grommet 48 in much the same manner as grommet 16 secures upright portion 34 to cover 12. Central portion 38 of yoke 32 is laterally bent at a medial position 60 away from spool 30 toward jar 10. Adjacent position 60 is an opening 62 similar in size to opening 58 and generally in registry with the middle of spool 30. Openings 62, 58 have grommets 64, 66 secured therein, respectively, and cooperate together to guide string 68 from spool 30 upon which it is stored into the adhesive 70 and out of jar 10 through passageway 28 in shaft 20, contacting only grommets 64, 66 and yoke 32. While yoke 32 is relatively rigidly supported on cap 12 and thereby provides a relatively rigid support for shaft 20, yoke 32 in combination with jar 10 further prevents any substantial movement of the shaft 20 which would cause spool 30 to rub against jar 10. Such prevention is accomplished by yoke 32 touching jar 10 at medial point 60 and at end 42 to prevent any up-and-down motion of spool 30. To prevent any sideways movement, yoke 32 is made of sufficiently wide material that the contact jar 10 at medial point 60 and end 42, above-mentioned, is made at the opposite edges of yoke 32 rather than at a single central point.

Secured to end 22 of shaft 20 is a rotary seed applicator 72 generally comprising a base member 74 and a cover 76 which fit together forming an applicating chamber 78. Shown in FIGS. 1, 4, 7 and 10 are side views of four embodiments of the rotary seed applicator of this invention; each embodiment can be secured to shaft 20 in the same manner and are therefore completely interchangeable with each other embodiment.

Base members 74, 142 and 194, in the preferred constructions of the above-mentioned four embodiments, respectively, are secured to shaft 20 in the following manner. Shaft 20 adjacent end 22 is rolled, in a conventional manner, to form an annular ridge 21 having a surface 23 lying in a plane perpendicular to the axis of shaft 20. The above-mentioned respective base members 74, 142 or 194 are then slid onto shaft 20 at end 22 to a position contiguous surface 23; and then the end 22 of shaft 20 is rolled in a conventional manner, against the inside surface of the respective base member securing the same between the rolled end 22 and the annular ridge 21.

Figure 2:
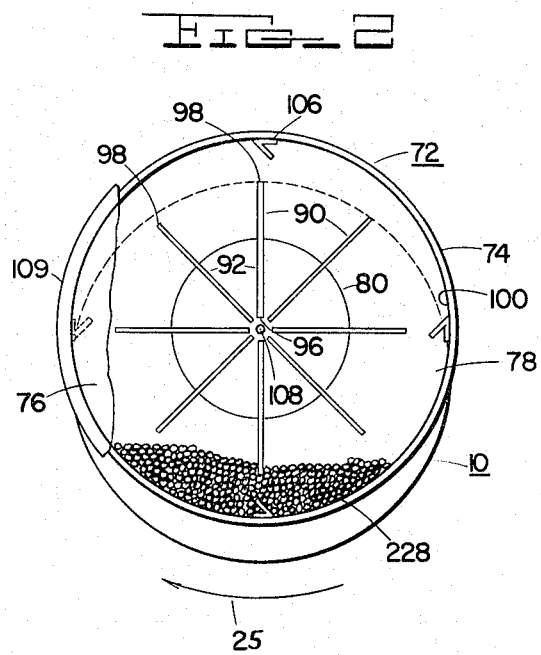
FIG. 2 is a front view of the embodiment of this invention shown in FIG. 1 with the cover partly broken away.

Referring now to FIGS. 1, 2 and 3, there is shown one embodiment of a rotary seed applicator 72 having a conical protrusion 80 with a rod 82 secured to or formed on the base 84 thereof and extending outwardly therefrom. Rod 82 is inserted through a central opening 86 in base member 74 and into passageway 28 wherein rod 82 frictionally engages the walls of passageway 28 thereby securing protrusion 80 to end 22 of shaft 20 with base member 74 therebetween and preventing independent rotation between protrusion 80, base member 74 and shaft 20. Protrusion 80 in this fashion is coaxially secured to base 74 within applicating chamber 78. A passageway 88 is coaxially located in protrusion 80 and rod 82 communicating with the applicating chamber 78 and the interior of passageway 28 in shaft 20, a portion of passageway 88 being coaxial with passageway 28. A plurality of blades 90 formed of sheet material are secured by means of slots 92 formed in protrusion 80 into which blades 90 are frictionally inserted. Blades 90 are contiguous and perpendicular to protrusion 80, base member 74 and cover 76. Blades 90 extend from a first lateral edge 96 adjacent the communication of passageway 88 with the applicating chamber 78 at the apex 94 of the protrusion 80 radially outwardly to a second lateral edge 98 which is parallel to and laterally spaced apart from edge 96. Edge 98 is longer than edge 96 and is also parallel and spaced apart from the wall portion 100 of base member 74. Blades 90 have longitudinal edges 102 and 104 which have a parallel portion adjacent protrusion 80 and a portion located radially outwardly of protrusion 80 in which edges 102, 104 diverge outwardly and are contiguous to base member 74 and cover 76, respectively.

Secured to wall portion 100 in spaced apart relationship with every other of the blades 90 are a plurality of applicating surfaces 106 which extend from wall 100 toward every other of blades 90. In the preferred embodiment shown in the FIGS. 1, 2 and 3, surfaces 106 form acute angles with wall 100 opening in direction of rotation of the rotary seed applicator 72 as indicated by arrow 25 in FIG. 2.

Cover 76 is removably secured to wall portion 100 of base 74 by a flange 109 and is provided with a coaxial opening 108 which registers with passageway 88 when cover 76 is positioned onto base member 74. Opening 108 provides communication from applicating chamber 78 to positions exterior of the rotary seed applicator 72 thereby permitting the string 68 which is wet with adhesive within jar 10 to be drawn through passageway 28 and passageway 88 into applicating chamber 78 and through opening 108. Opening 76 is desirably spaced from apex 94 an axial distance of at least one-third of the circumference of spool 30 for reasons to be mentioned hereinafter.

Referring now to FIGS. 4, 5 and 6 there is illustrated a second embodiment of my invention. This second embodiment is in most ways identical to the first embodiment as indicated by like reference numerals that are assigned like parts. The second embodiment of this invention shown in FIGS. 4, 5 and 6 differs from the first embodiment of this invention shown in FIGS. 1, 2 and 3 substantially in only two ways. First, the yoke 32 and the support member 50 are formed integrally out of one strip of metal forming a yoke 110 which is in all other ways identical to yoke 32 of the first embodiment, including the means by which it is mounted on cover 12. Yoke 110 of this second embodiment therefore, is completely interchangeable with yoke 32 and can be used with the first embodiment shown in FIGS. 1, 2 and 3. More specifically, yoke 110 is formed of a single piece of strip metal into substantially a U shape having opposite ends 120 and 122, a pair of upright portions 112, 114, a central portion 116 and a support portion 118. Support portion 118 is located intermediate upright portion 114 and end 122. Yoke 110 has two openings, 124 and 126, located in upright portions 112 and 114 adjacent ends 120 and 132 at a medial position between central portion 116 and support portion 118, respectively. Yoke 110 is mounted on cover 12 in a manner and position identical with that of yoke 32 of FIG. 1; upright portion 112 is located adjacent cover 12, and upright portion 114 is located intermediate spool 30 and end 24 of shaft 20. Central portion 116 is bent laterally at a medial position 128 away from spool 30 toward jar 10 so as to place the medial position 128 in contact with jar 10. Opening 130 is located in central portion 116 adjacent position 128 generally in registry with the middle of spool 30. Support portion 118 is integrally joined to upright portion 114 at a bend 132 adjacent spool 30 and in contact with jar 10. From bend 132 support portion 118 depends downwardly positioning end 122 adjacent end 24 of shaft 20. Adjacent end 122 is located an opening 134 similar in size and shape with opening 130. Openings 130 and 134 have grommets 136, 138 secured therein, respectively, and cooperate together to guide string 68 from spool 30 into adhesive 70 which is placed in jar 10 and out of jar 10 through passageway 28 in such a manner that string 68 only contacts grommets 136, 138 and portion 116. The engagement of yoke 110 with jar 10 at point 128 and bend 132 stabilized the spool 30 in the same manner as yoke 32 afore-described.

Secondly, the second embodiment, as shown in FIGS. 4, 5 and 6, illustrates a rotary seed applicator 72a which is in some respects different from the rotary seed applicator 72 shown in FIGS. 1, 2 and 3. Referring specifically to FIGS. 4, 5 and 6, there is shown a rotary seed applicator 72a comprising a base member 142, and a cover 144 which combines with base member 142 to enclose an applicating chamber 146. Base member 142 is secured to shaft 20 in the same manner as base member 74 hereinabove described. Base member 142 is generally cylindrical having a frustum of a cone 148 formed coaxially in its bottom 150 extending into applicating chamber 146. Coaxially located on the top surface 152 of the frustum 148 is an opening 154 which extends through bottom 150. A conical member 156 having a base 158 of generally identical shape and size as surface 152 and having a rod 160 coaxially secured thereto extending outwardly from base 158 is coaxially mounted on surface 152 of base 142, and in turn, coaxially mounted onto end 22 of shaft 20 by inserting rod 160 through opening 154 and into passageway 28. There, rod 160 frictionally engages the walls of passageway 28 in a securing manner thereby preventing independent rotation of conical member 156 and shaft 20. Rod 160 and conical member 156 have a coaxial passageway 162 passing through the apex of conical member 156 and communicating with passageway 28 and with applicating chamber 146.

Integrally formed on conical member 156 are a plurality of blades 166 which have a portion 161 contiguous to conical member 156 and a portion 163 radially outwardly of member 156 contiguous to bottom 150. Blades 166 extend from a first lateral edge 165 adjacent the communication of passageway 162 with the applicating chamber 146 at the apex 164 of the conical member 156 radially outwardly to a second lateral edge 167 spaced from wall 168 of base member 142. Lateral edges 167 are parallel to, laterally spaced apart from, and longer than lateral edges 165. Further, blades 166 have longitudinal edges 170, 172 that are parallel in portion 161 adjacent conical members 156 and for a distance radially outwardly therefrom, and divergent in portion 163 adjacent lateral edge 167. A disc 174 having a central opening 176 is integrally formed on longitudinal edges 170 of blades 166 with opening 176 in registry with passageway 162. Disc 174 is coaxial with the bottom 150 and conforms to the shape of edges 170 of blades 166. Blades 166 are spaced apart and are perpendicular to bottom 150 and disc 174. Disc 174 extends beyond lateral edges 167 of blades 166 having a periphery 178 which is spaced apart but adjacent base member 142 and cover 144. A plurality of applicating surfaces 106 are secured to wall 168 of base member 142. Surfaces 106 are spaced from and extend toward every other of blades 166. In the preferred embodiment shown in FIGS. 4, 5 and 6, surfaces 106 form acute angles with wall 100 opening in the direction of rotation of the rotary seed applicator 72a as indicated by arrow 25 in FIG. 5.

Cover 144 is removably secured to wall 168 of base 142 by flange 145 and is spaced apart from disc 174 thereby providing applicating chamber 146 with two portions 180, 182 which are separated by disc 174. Portion 182 is undivided and bounded by disc 174 and cover 144. Portion 180 is bounded by disc 174 and bottom 150 and is sectored by blades 166. Cover 144 has a coaxial opening 184 in alignment with passageway 162 and is spaced apart from conical member 156 an axial distance of at least one-third the circumference of spool 30. String 68 is thereby wet with adhesive within jar 10 and drawn through passageway 28, passageway 162, into portion 182, through opening 176 into portion 180 and through opening 184.

Figure 7:
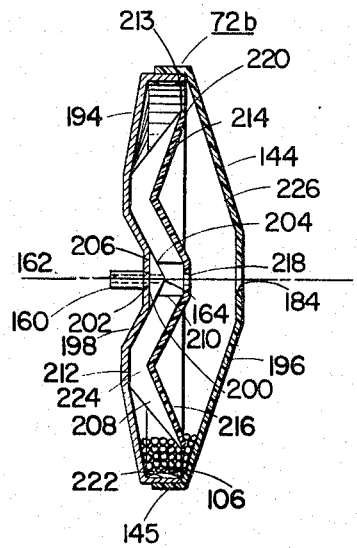
FIG. 7 is a side view, shown partly in cross-section, of a third embodiment of a rotary seed applicator that can be substituted for either the first embodiment or the second embodiment of the rotary seed applicator shown in FIGS. 1 and 4.
Figure 8:
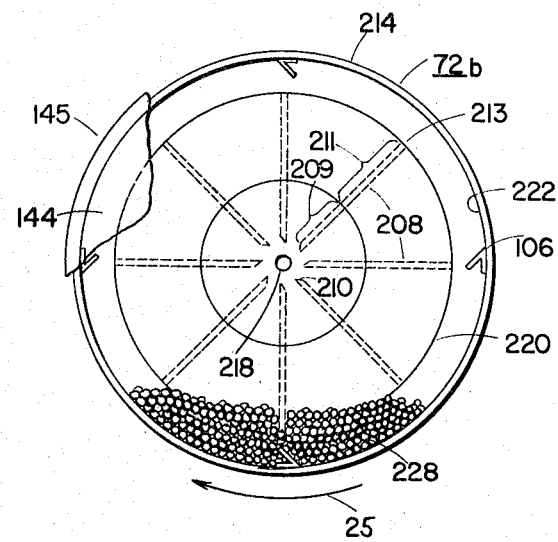
FIG. 8 is a front view of the embodiment of the rotary seed applicator shown in FIG. 7 with the cover partly broken away.
Figure 9:
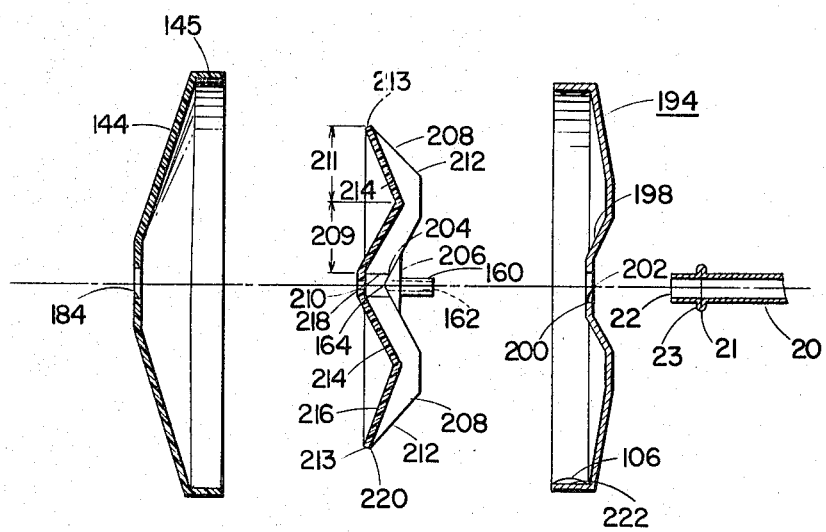
FIG. 9 is an exploded view, partly in cross-section, of the rotary seed applicator shown in FIG. 7.

Referring now to FIGS. 7, 8 and 9, there is illustrated a third embodiment of the rotary seed applicator 72 of this invention. This third embodiment 72b like the first and second embodiments of the rotary seed applicator 72 is interchangeable and may be used with the jar 10 and the apparatus shown contained therein in either FIGS. 1 or 4. This third embodiment has similarity in parts with the first and second embodiments of the rotary seed applicator 72, 72a, shown in FIGS. 1 through 6 as indicated by the like reference numerals that are attached to like parts. This third embodiment 72b of the rotary seed applicator 72 generally comprises a base member 194 which is secured to shaft 20 in the same manner as base members 74, 142, and a cover 144 which join together to form an applicating chamber 196. Base member 194 has coaxially formed thereon a conical frustum 198 which protrudes inwardly into applicating chamber 196. The conical frustum 198 has a top surface 200 which has a concentric opening 202 formed therein. A conical member 204 is provided with a base 206 on which rod 160 is coaxially secured and extends outwardly therefrom. Conical member 204 is secured to end 22 of shaft 20 (shown in FIG. 9) in the same manner as described in reference to the first embodiment of applicator 72 hereinabove. A passageway 162 is formed in rod 160 and conical member 204. Passageway 162 is concentric with rod 160 and passes through apex 164 of conical member 204 communicating with the interior of passageway 28 of shaft 20 and with the applicating chamber 196.

Integrally formed on the conical member 204 are a plurality of blades 208 which extend from a lateral edge 210 adjacent the communication of passageway 162 with the applicating chamber 196 radially outwardly. Blades 208 are contiguous to base member 194 and conical member 204 and have opposite longitudinal edges 212 and 214 which are parallel in a portion 209 adjacent the conical member 204 and radially outwardly for a partial length of blades 208 and then convergent radially outwardly in a portion 211 intersecting at a distal point 213 adjacent but spaced from base member 194 and cover 144.

A disc 216 having a central opening 218 is integrally formed on longitudinal edges 214 of blades 208. Disc 216 generally conforms to the shape of edges 214 and is spaced from base member 194 by blades 208 which are perpendicular to the disc 216. Opening 218 is in registry with the passageway 162 and the periphery 220 of disc 216 is coincident with the intersection 213 of longitudinal edges 212 and 214. A plurality of applicating surfaces 106 are secured to wall portion 222 of base member 194. Surfaces 106 form acute angles with wall portion 222 which open in the direction of rotation 25 and extend toward but are spaced apart from every other of the blades 208, as in the first and second embodiments of applicator 72. Disc 216 like disc 174 of the second embodiment partitions the applicating chamber 196 into two portions 224, 226. Portion 226 is undivided and lies between disc 216 and cover 144; portion 224 lies between disc 216 and base portion 194 and is sectored by blades 208; portion 226 has a thickness such that the axial distance between cover 144 and apex 164 is at least one-third the circumference of spool 30.

Referring now to FIGS. 10 and 11, there is illustrated a fourth embodiment of the rotary speed applicator 72 of this invention. This fourth embodiment like the first three embodiments of the rotary seed applicator 72 is interchangeable and may be used with the jar 10 and the apparatus shown contained therein in either FIGS. 1 or 4. This fourth embodiment has similarity in parts with the first three embodiments of the rotary seed applicator 72 shown in FIGS. 1 through 6 as indicated by the like reference numerals that are attached to like parts. This fourth embodiment of the rotary seed applicator 72 generally comprises a base member 74 and a cover 144 which join together to form an applicating chamber as aforedescribed. A conical member 80a is identical in all respects with the conical member 80 except that slots 92 are omitted, is coaxially secured to end of shaft 20 (shown in FIG. 10) in the same manner as described in reference to the other embodiments of applicator 72 hereinabove described. A plurality of tapered blades 81 have longitudinal edges 83, 85 and a base edge 87. Blades 81 are secured substantially normal to the exterior of conical member 80a with edges 85 contiguous to the exterior of conical member 80a and edges 87 flush with base 84. Edges 83, 85 join adjacent apex 94 thereby providing a diminishing blade width from the base 84 to the apex 94. Secured to the exterior edges 83 of blades 81 conical member 80 is a vaned member 230. Vaned member 230 comprises base portion 232 and a plurality of blades 234. Base 232 is hollow and has a shape of a frustum of a cone having two opposite end openings 236, 238, an exterior conical surface 240, and an interior conical surface. Opening 236 is substantially smaller than the opening 238 thereby providing that the exterior surface 240 slopes toward the end opening 236. Secured to surface 240 are the blades 234 in spaced apart relationship. Blades 234 extend radially from end opening 236. Vaned member 230 is secured onto conical protrusion 80a in such a manner that the apex 94 of the protrusion is positioned within the vaned member 230 and the edges defining the end opening 236 are partially contiguous to the conical surface of the protrusion 80a. Since the end opening 236 is not perfectly circular and the vaned member is spaced apart from conical members by blades 81, openings are left (not shown) between the vaned member 230 and the protrusion 80a when they are secured together. The securance of vaned member 230 to blades 81 and blades 81 to conical member 80a may be made by adhesive, solder, welding, brazing, or any other conventional means, depending upon the material of the vaned member 230, the blades 81 and the conical protrusion 80a. With the vaned member 230 secured to the conical protrusion 80a, the blades 234 extend from a lateral edge 242 adjacent the conical protrusion 80a to an edge 244 which is parallel to edge 242 and spaced apart from both base member 174 and cover 144. Blades 234 also have longitudinal edges from 246, 248 which extend in substantially parallel relationship to each other between the edges 242, 244. Edges 246, 248 unlike the other embodiments of this invention are neither contiguous to nor parallel with any of the surfaces of the base member 74 or the cover 144. The vaned member 230 is preferably made from an annular piece of sheet material which is crimped at equally spaced distances in order to form the blades 234.

A plurality of applicating surfaces 106 are shaped and secured to wall portion 100 in the same manner as abovedescribed. Vaned member 230, like discs 174, 216 of the second and third embodiments, respectively, partitions the applicating chamber into two parts. One portion is undivided and lies between the cover 144 and the interior surface of the vaned wheel 230. The other portion lies between the surface 240 of the vaned wheel 230 and the base portion 74 and is sectored by the blades 234.

In the specific embodiments of the rotary seed applicator shown in FIGS. 1 through 9, blades 90, 166 and 208 are shown eight in number. (Consecutive numerals indicate similar but not identical devices in the first, second and third embodiments, respectively.) In contrast in FIGS. 10 and 11, blades 234 are shown six in number and blades 81 are shown four in number. Further, applicating surfaces 106 are shown in each embodiment to be four in number. It will be readily understood that changes in the number of blades 90, 166, 208, 81 and 234 or the applicating surfaces 106 can be made within the scope of this invention. In the first and fourth embodiments, preferably blades 90, 81 and rods 82 are made of metal such as stainless steel, brass or the like and secured onto the protrusion 80, 80a, respectively, as aforementioned. Further, base members 74, 142, 194 are also preferably made of metal such as that described above.

Covers 76, 100, 144 are shown in the drawings to be made of a rigid and moldable plastic, and preferably transparent so that operation of the applicators may be viewed through the same. In the second and third embodiments of the applicator, 72a, 72b, blades 166, 208, discs 216, 174 and conical protrusions 156, 204, along with rods 160 are preferably made of integrally molded rigid plastic thereby providing that the blades, discs, and conical protrusions are formed in a single piece. Still further, in each embodiment, shaft 20 is preferably made out of rigid and self supporting metal which can be rolled in the conventional manner afore-mentioned. However, each of the above mentioned parts can be made of various materials other than those hereinbefore mentioned as preferable, so long as those materials are sufficiently rigid to be self supporting and have the strength necessary to perform the function of that part herein described.

In operation, a quantity of string 68 is stored on spool 30 and adhesive 70 is stored in jar 10 so as to completely submerge the medial points 60 and 128 of yokes 32 and 110. Further, seeds of the species desired to be planted are placed within the applicating chamber 78, 146, or 196. The end of string 68 exteriorly of the apparatus of this invention may then be secured as by a peg, at one end of a trench that is desired to be planted with the seeds located within the rotary seed applicator 72. The operator of the apparatus then moves the apparatus of this invention away from the securance of string 68 toward the other end of the row. This movement of the apparatus of this invention is usually done by holding the apparatus in one's hand and walking toward the other end of the row; however, this may be done mechanically by a small tractor or other such device. As the apparatus is moved, string 68 is dispensed from its storage position on spool 30 into the adhesive 70 and through the string-guiding aperture 62, 130, out of the adhesive 70 through the string-guiding aperture 58, 134 and through passageways 28, 88, 162 into the applicating chambers 78, 146 and 196, and out through the openings 108 and 184. As the string 68 unwinds from spool 30, the spool 30 is rotated which in turn rotates shaft 20 and the rotary seed applicators 72, 72a, 72b in the direction of arrow 23. String 68 also rotates as it progressively unwinds from spool 30 and is guided through the applicating chambers 78, 146 and 196. Yokes 32, 110 along with jar 10 remain stationary as string 68 unwinds from spool 30. As string 68 passes through string-guiding apertures 134, 58 any excess adhesive 70 which has collected on the string 68 is wiped off and when sufficient accumulation occurs, drips back in main reservoir of adhesive 70.

The apparatus of this invention is desirably moved from one end of a row that is to be planted toward the other at a speed such that the withdrawal of string 68 from spool 30 will rotate shaft 20 at a speed such that rotary seed applicator 72 will rotate at a speed less than the critical speed at which the seed will be forced against walls 100, 168, 222 by centrifugal force. However, at speeds less than the critical speeds, seeds 228 will normally seek the lowest portions of the rotary seed applicator by gravity as shown in FIGS. 1, 4 and 7. Seeds 228 are there collected on the applicating surfaces 106 and carried upwardly to a position in which the seeds 228 are dumped into that portion of the rotary seed applicator which is sectored by the blades 90, 166, 208, 234. The blades 90, in combination with base portions 74 and cover 76 in the first embodiment shown in FIGS. 1, 2 and 3 funnel the gravity flow of seeds 228 into a dense flowing column which impinges upon the string 68 wet with adhesive adjacent the apex of the protrustion 80. Similarly, in the second, third, and fourth embodiments as shown in FIGS. 4 through 11, blades 166, 208 and 234 in cooperation with discs 174, 216 and vaned member 230 and base members 74, 144, funnel the seeds 228 into a dense flowing stream directed at the string 68 wet with adhesive. By this means, the seeds 228 are substantially and continuously impinged upon the string 68 wet with adhesive and are randomly secured thereto. Some seed 228 may rest on string 68 and not be secured thereto; however, the rotation of string 68 will dislodge those seeds before the string 68 is drawn out of the rotary seed applicator if the string 68 is permitted to rotate several degrees before being drawn through openings 108, 184 in cover 76, 144, and laid in the ditch thereupon to be covered by earth. Experimentation has shown that string 68 must travel a distance of at least one-third the circumference of spool 30 before the excess seeds 228 are dislodged. Applicating surfaces 106 in the first embodiment of the rotary seed conveyor 72, dump all of the seeds 228 carried thereon into the sectored portion of the rotary seed conveyor 72. However, in the second, third and fourth embodiments of the rotary seed applicator, structural provisions are made so that most of the seeds 228 which are carried upwardly by the conveying surface 106 are dumped into the sectored portion of the rotary seed applicators. This provision of the second, third and fourth embodiments of the rotary seed applicators provides for carrying a substantially larger amount of seed 228 than the first embodiments of the rotary seed applicator 72 without excessively losing seed through openings 108, 184 of covers 74, 144 thereby unintentionally planting seeds.

While there have been described above the principles of this invention in connection with specific apparatus, it is to be clearly understood that this description is made only by way of example and not as a limitation to the scope of the invention.

What is claimed is:

1. An apparatus for adhesively securing seeds onto a string comprising a wide-mouth container having a closure adapted to form a liquid-tight seal with the mouth of said container for closing the same, said closure having a first opening therein, a shaft rotatably supported in said opening and having a first end exteriorly of said container and a second end interiorly of said container, said shaft having a coaxial first passageway extending therethrough and communicating with both of said shaft ends, a spool coaxially positioned on said shaft intermediate said closure and said second end within said container, said spool being secured to said shaft, said spool being rotatable with said shaft, a yoke formed of strip metal having opposite ends formed into generally a U shape to define a pair of upright portions and an interconnecting central portion, said yoke having two second openings positioned adjacent said opposite ends, respectively, said yoke being secured to said closure with said upright portions being positioned on said shaft contigous to said closure and intermediate said closure and said spool and intermediate said spool and said second end, respectively, said first and second openings being in registry, said yoke being suspended from said closure and depending from said shaft, said shaft being rotatable independently of said yoke and said closure, a grommet secured in said first opening and one of said second openings of said closure and said yoke, respectively, said central yoke portion being bent laterally at a medial position away from said spool, said medial position being contiguous to said container, a first-string-guiding aperture formed in said central yoke portion adjacent said medial position, a support having a second string-guiding aperture formed therein, said support being secured to said yoke adjacent said second shaft end having a portion contiguous with said container, said second aperture being positioned in relation with said first aperture and said first passageway to guide the dispensing of string from said spool and through said passageway with said string contacting only said yoke and said apertures, a rotary seed applicator having generally cylindrical base member and a cover, said base member being secured to said shaft and having a side wall and a bottom with a first coaxial opening therein, and said cover including a flange removably fitting over said side wall and enclosing said applicator thereby forming an applicating chamber, said applicator being secured to said first shaft end exteriorly of said container, said applicator being rotatable with said shaft, said cover having a second opening therein in registry with said first opening and said second passageway whereby adhesive may be placed within said container and string can be dispensed from said spool, wet with adhesive in said container, and drawn through said aperture and said first passageway into said applicating chamber, whereby seeds contained therein are continuously and adhesively secured to said string thereby providing a string having seeds adhered thereon.

2. The apparatus of claim 1 wherein said support is integrally formed on said yoke adjacent said second shaft end, said support forming a continuation of said upright portion positioned on said shaft.

3. The apparatus of claim 1 wherein said rotary seed applicator further comprises a conical protrusion having a base with a coaxial rod secured thereto and extending outwardly therefrom, said rod being inserted through said first opening into said first passageway from said first shaft end, said rod frictionally engaging the walls of sail first passageway in a securing manner thereby securing said conical protrusion to said shaft, said protrusion and said rod having a second passageway communicating with said first passageway and said applicating chamber, said second passageway passing through the apex of said protrusion, said protrusion extending into said applicating chamber and being concentric with said bottom and in registry with said second opening, a plurality of blades secured to said protrusion, a plurality of applicating surfaces secured to said wall of said base, said surfaces being spaced apart, said surfaces extending inwardly from said wall whereby seed may be placed within said applicating chamber and said applicator rotated thereby to cause a flowing stream of seed to impinge on said string wet with adhesive drawn through said first and second passageways into said applicating chamber.

4. The apparatus of claim 3 wherein said blades extend from a first lateral edge adjacent the communication of said passageway with said applicating chamber at said apex of said protrusion outwardly to a second lateral edge spaced from said base member, said second lateral edges being parallel to and laterally spaced apart from said first lateral edges, said second lateral edges being longer than said first lateral edges, said blades having a pair of longitudinal edges, said edges being parallel adjacent said protrusion and divergent in a portion of said edges located outwardly of said protrusion, said portion of one of said pair being contiguous to said bottom, the other of said pair being contiguous to said cover, and wherein said cover conforms generally to the shape of said blades.

5. The apparatus of claim 3 further comprising a vaned member having a frusto-conical shape, interior and exterior conical surfaces, and opposite end openings of different sizes defined by edges, said vaned member being secured to said protrusion with said edges defining the smaller of said end openings partially contiguous to said protrusion intermediate said apex and said base of said protrusion leaving openings therebetween, said apex of said protrusion being within said vaned wheel, and wherein said blades are mounted on said exterior surface extending from a lateral edge adjacent said protrusion to a second lateral edge which is spaced apart and parallel to said first lateral edge and spaced apart from both said cover and said base member, said applicating chamber being divided by said vaned member into a first portion which is undivided and bounded by said cover an said interior surface, and a second portion which is sectored by said blades and bounded by said exterior surface and said base member.

6. The apparatus of claim 3 wherein the distance between said apex of said protrusion and said cover is at least one-third the circumference of said spool.

7. The apparatus of claim 4 wherein said blades are integrally formed on said protrusion and further comprising a disc having central opening, said disc being integrally formed on said blades and spaced from and coaxial with said cover and said base member, said disc conforming to the shape of said blades, said central opening being in registry with said second passageway and second opening, said cover being concaved outwardly and away from said disc, said applicating chamber being divided by said disc into a first portion which is sectored by said blades and bounded by said disc and said base member, and a second portion which is undivided and bounded by said cover and said disc.

8. The apparatus of claim 6 wherein said blades have longitudinal edges which are parallel adjacent said protrusion and diverge outwardly from said protrusion, and wherein said disc extends beyond said second lateral edge of said blades.

9. The apparatus of claim 6 wherein said blades have longitudinal edges which are parallel adjacent said protrusion and converge outwardly from said protrusion, and wherein said disc has a periphery coincident with the intersections of said longitudinal edges.

10. An apparatus for adhesively securing plant seeds onto a string comprising a container having a closure adapted to form a liquid-tight seal with said container for closing the same, said closure having an opening therein, a bearing secured in said opening, a shaft supported in said bearing, said shaft being rotatable independently of said container, said shaft having a first end exteriorly of said container and a second end interiorly of said container, said shaft having a coaxial first passageway extending therethrough communicating with both of said shaft ends, a string storing and dispensing means secured on said shaft intermediate said closure and said second end within said container, said means being rotatable with said shaft, a pair of string guides having string-guiding apertures formed therein supported on said closure, one of said pair being positioned adjacent said container and at a position intermediate the ends of said means, the other of said pair being positioned adjacent said second end for guiding string into said first passageway, a rotary seed applicator having a base member and a cover, said base member having walls and a centrally located first opening therein, said base member and cover fitting together to form an applicating chamber, said base member being secured to said shaft at said first end exterior of said container, said cover having a second opening therein in registry with said first opening and said first passageway, said applicator having means for agitating and conveying seed therein whereby adhesive may be placed within said container and string can be dispensed from said means, wet with said adhesive in said container and drawn through said apertures and said first passageway into said applicating chamber, whereby seeds contained therein are continuously and adhesively secured to said string thereby producing a string having seeds adhered thereon.

11. The apparatus of claim 8 wherein said agitating and conveying means comprises a conical protrusion having a base with a rod extending outwardly therefrom, said rod being inserted through said first opening into said first passageway and secured therein, said protrusion having a second passageway communicating with said first passageway and said applicating chamber, said second passageway passing through the apex of said protrusion, said protrusion extending into said applicating chamber and being concentric with said bottom and in registry with said second opening, a plurality of blades secured to said protrusion, said applicating chamber being sectored by said blades, a plurality of applicating surfaces secured to said wall of said base member, said surfaces being spaced apart from said blades whereby seed may be placed within said applicating chamber and said applicator rotated thereby to cause a flowing stream of seed to impinge on said string wet with adhesive drawn through said second and third passageways into said applicating chamber.

12. The apparatus of claim 8 further comprising a disc having a third central opening therein secured to said blades in spaced apart relationship with said base and said cover and with said third opening in registry with said second opening thereby dividing said applicating chamber into a first portion sectored by said blades and a second portion being undivided, said portions being separated by said disc.

13. An apparatus for adhesively securing plant seeds onto a string comprising a container having a closure adapted to form a liquid-tight seal with said container for closing the same, said closure having an opening therein, a shaft supported in said opening, said shaft being rotatable independently of said container, said shaft having a first end exteriorly of said container and a second end interiorly of said container, said shaft having a passageway extending therethrough and communicating with said first and second ends, means for guiding string from within said container into adhesive contained therein, through said passageway and out of said container, said means being secured to said closure, a rotary seed applicator having a base member and a cover, said base member having a centrally located first opening therein, said base member and cover cooperating to form an applicating chamber, said applicator being secured to said shaft at said first end exteriorly of said container, said cover having a second opening therein in registry with said first opening and said first passageway whereby adhesive can be placed within said container and string can be dispensed from said means, wet with said adhesive in said container and drawn through said apertures and said passageways into said applicating chamber, whereby seeds contained therein are continuously and adhesively secured to said string thereby producing a string having seeds adhered thereon.

14. The apparatus of claim 9 wherein said rotary seed applicator further comprises means in said applicator for agitating and conveying seeds therein thereby forming a substantially continuous gravity flow of seed onto said string.

15. The apparatus of claim 10 wherein said agitating and conveying means is spaced from said cover.

16. The apparatus of claim 9 further comprising a spool for accommodating a quantity of said string thereon, said spool being secured to said shaft within said container and rotatable with said shaft whereby withdrawal of string from said spool rotates said spool, shaft and applicator.

No references cited.

EARL M. BERGERT, *Primary Examiner.*

D. J. DRUMMOND, *Assistant Examiner.*

UNITED STATES PATENT OFFICE
CERTIFICATE OF CORRECTION

Patent No. 3,310,448                           March 21, 1967

Myron D. Tupper

It is hereby certified that error appears in the above numbered patent requiring correction and that the said Letters Patent should read as corrected below.

Column 3, line 32, after "contact" insert -- with --; column 5, line 3, for "stabilized" read -- stabilizes --; line 44, for "members" read -- member --; column 6, line 62, for "speed" read -- seed --; column 10, line 23, for "sail" read -- said --; line 69, for "an" read -- and --; column 11, line 3, after "having" insert -- a --.

Signed and sealed this 21st day of November 1967.

(SEAL)

Attest:

Edward M. Fletcher, Jr.

Attesting Officer

EDWARD J. BRENNER

Commissioner of Patents